US010590046B2

(12) United States Patent
Buzruk et al.

(10) Patent No.: US 10,590,046 B2
(45) Date of Patent: Mar. 17, 2020

(54) COMPOSTING DEVICE WITH DOOR AND FASCIA

(71) Applicant: WHIRLPOOL CORPORATION, Benton Harbor, MI (US)

(72) Inventors: Abhishek P. Buzruk, Maharashtra (IN); Christopher C. Wilcox, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 459 days.

(21) Appl. No.: 15/158,660

(22) Filed: May 19, 2016

(65) Prior Publication Data

US 2017/0334799 A1 Nov. 23, 2017

(51) Int. Cl.
*C05F 17/02* (2006.01)

(52) U.S. Cl.
CPC ...... *C05F 17/0205* (2013.01); *C05F 17/0258* (2013.01); *Y02P 20/145* (2015.11); *Y02W 30/43* (2015.05)

(58) Field of Classification Search
CPC .. C05F 17/0205; C05F 17/0258; B65D 43/20; B01L 2300/041; Y10S 220/908; C12M 23/40; B02C 23/02; B02C 18/0084; B02C 18/18; B02C 18/2216; B02C 18/2258; B02C 18/24; Y02P 20/145; Y02W 30/43
See application file for complete search history.

(56) References Cited

U.S. PATENT DOCUMENTS

| 3,773,399 | A | * | 11/1973 | Sulcek | A47B 96/201 312/204 |
| 4,732,431 | A | * | 3/1988 | Mason | E06B 5/006 312/109 |
| 5,496,104 | A | * | 3/1996 | Arnold | A47L 15/4265 16/DIG. 14 |
| 5,775,579 | A | * | 7/1998 | Kardum | A61L 31/08 232/43.1 |
| 6,736,470 | B2 | * | 5/2004 | Manke | A47L 15/4265 312/228 |
| 6,840,773 | B2 | * | 1/2005 | Anderson | B44C 3/02 434/72 |
| 7,014,281 | B2 | * | 3/2006 | Wuestefeld | A47L 15/4265 126/194 |

(Continued)

FOREIGN PATENT DOCUMENTS

| CN | 204355578 U | 5/2015 |
| DE | 19803374 A1 | 8/1998 |

(Continued)

OTHER PUBLICATIONS

Andrews, EP0103753 Translation from EPO Espacenet, accessed on Mar. 11, 2018 (Year: 2018).*

(Continued)

Primary Examiner — William H. Beisner
Assistant Examiner — Danielle B Henkel
(74) Attorney, Agent, or Firm — McGarry Bair PC

(57) ABSTRACT

The disclosure relates to a composting device including a housing defining an interior with an access opening providing access to the interior, a composter bin located within the interior and in communication with the access opening, and a door mounted to the housing that includes a fascia.

18 Claims, 5 Drawing Sheets

(56) References Cited

U.S. PATENT DOCUMENTS

| | | |
|---|---|---|
| 7,621,472 B2 | 11/2009 | Manu |
| D658,839 S | 5/2012 | Cohn |
| 2004/0201337 A1* | 10/2004 | Wuestefeld ......... A47L 15/4265 312/311 |
| 2005/0054085 A1* | 3/2005 | Nagy .................. C05F 17/0205 435/290.1 |
| 2013/0206020 A1 | 8/2013 | Iacobucci |
| 2013/0217111 A1 | 8/2013 | Chang |
| 2015/0031123 A1 | 1/2015 | Delgado et al. |
| 2017/0260108 A1 | 9/2017 | Koh |

FOREIGN PATENT DOCUMENTS

| | | |
|---|---|---|
| EP | 0103753 A2 | 3/1984 |
| GB | 2252898 A | 8/1992 |
| KR | 20090075306 A | 7/2009 |
| KR | 20110073656 A1 | 6/2011 |
| WO | 2010090537 A2 | 8/2010 |

OTHER PUBLICATIONS

European Search Report for Counterpart EP17159966.5, dated Oct. 10, 2017.

\* cited by examiner

COMPOSTING DEVICE WITH DOOR AND FASCIA

BACKGROUND

Composting devices are known to implement a composting cycle for biologically and chemically decomposing organic material, such as food waste, into compost for use as a fertilizer and soil amendment. The composting cycle can be implemented in a composting bin by providing water, heat and aeration to the refuse, and can require a period of time for completion.

The composting device can be located in a kitchen or environment in which it is desirable for parts of the composter like a door through which food waste is received within the composter to be aesthetically pleasing and complement the decor. Additionally when organic material is introduced into the composting device through the door, the door itself can become dirty after repeated uses.

BRIEF SUMMARY

In one aspect, a food composter comprising a housing defining an interior and an access opening providing access to the interior, a composting bin located within the interior and having a fill opening aligned with the access opening, a door selectively closing the access opening and having an outer surface, and a fascia overlying at least a portion of the outer surface and detachably mounted to the door.

In another aspect, a food composter comprising a housing defining an interior and an access opening providing access to the interior, a composting bin located within the interior and having a fill opening aligned with the access opening, a door selectively closing the access opening and having an outer surface, and a fascia overlying at least a portion of the outer surface and having a snap connecting snap-fitting the fascia to the door.

In an additional aspect, a food composter comprising a housing defining an interior and having an end plate with an access opening providing access to the interior, a composting bin located within the interior in a generally vertical orientation and having a fill opening aligned with the access opening, a door selectively closing the access opening and having an outer surface, and a fascia overlying at least a portion of the outer surface and having a snap connecting snap-fitting the fascia to the door.

DETAILED DESCRIPTION

Figure 1:
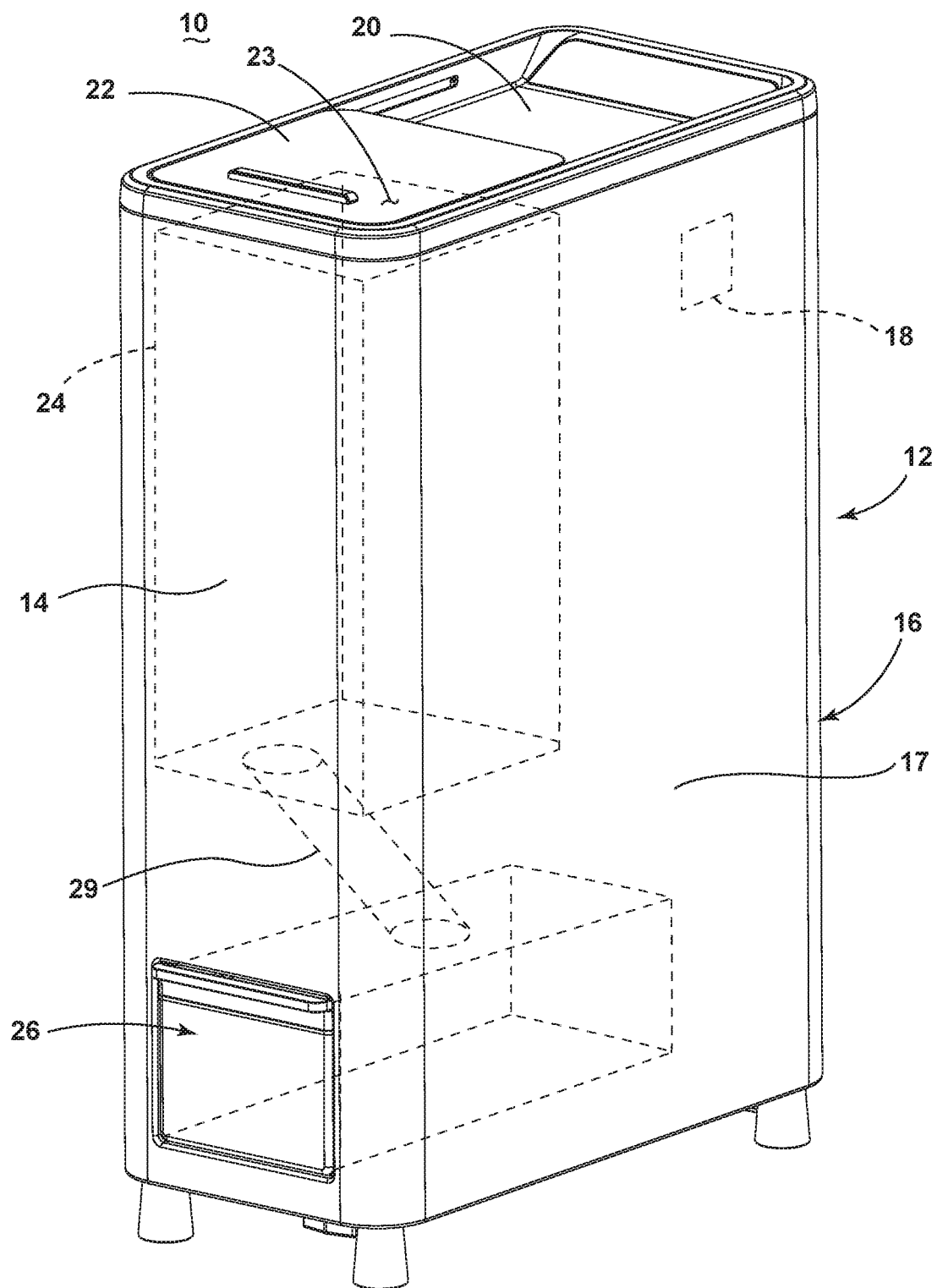
FIG. 1 is a perspective view of a composting device.

FIG. 1 illustrates a perspective view of a composting device 10 or a food recycler oriented in the vertical direction for transforming organic material into compost by way of a composting cycle of operation. The composting device 10 can include a housing 12 defining an interior having a front wall 14 spaced from a back wall 16, a pair of side walls 17, and a controller 18 located within the housing 12.

A top wall 20 can enclose the housing 12 at the top of the front wall 14, back wall 16, and the pair of side walls 17. The housing 12 can be any structure for enclosing, supporting and protecting the electrical and mechanical components of the composting device 10 including, but not limited to a cabinet with a frame.

The housing 12 further comprises a lid assembly 28 which can include the top wall 20 and a door 22 slidably mounted to the housing 12 for sliding movement between open or closed positions to enable access to the interior of the composting device 10. The door 22 can be any barrier that provides selective access for inputting organic material into the composting device 10, including, but not limited to a hingedly, slidably or removably mounted cover, drawer, panel or lid. While shown in FIG. 1 as coupled to the top wall 20, the door 22 can be mounted to any exterior wall enclosing the housing 12 including, but not limited to the front wall 14.

The top wall 20, as well as the remainder of the housing 12, can be formed of any material suitable for construction of the housing structure including, but not limited to metal such as steel or steel alloy, plastic, composite materials such as a hardened polymer composite material and combinations thereof. Some models of composting devices 10 can include decorative panels that can be mounted on the housing 12 or one or more walls.

When in the open position, the door 22 provides access to the interior of the housing 12. In the open position, the door can further expose any element of the composting device 10 interior of the housing 12 including but not limited to one or more water fill inlets for supplying water to the composting device 10 and one or more enzyme dispenser inlets. A composter bin 24 is provided within the housing 12 and includes a fill opening 23. The composter bin 24 can be disposed beneath the door 22 such that the door provides selective access to the the fill opening 23 as the door is moved to the open position.

An access drawer 26 is provided and slides in or out through an opening in the front wall 14. The access drawer 26 is a drawer slidably mounted to the housing 12 on a horizontal axis for movement between open and closed positions. It will be understood, however, that access to the interior of the composting device 10 via the front wall 14 can be provided in other ways, including but not limited to, a door pivotally connected to the front wall 14. The access drawer can be detachably mounted to an internal side of the housing 12 and is accessible from outside the housing 12. The access drawer 26 can be removable from the interior of the housing 12 so that the contents thereof can be discharged at will by a user, as for example, by dumping the contents of the drawer 26 onto a garden.

Operation of the composting device 10 can be conventional and is not critical to the embodiments disclosed herein. For example, a conduit 29 can extend from the composter bin 24, such as from a lower portion of the composter bin 24, toward the access drawer 26. Embodiments of the disclosure can optionally include a transfer mechanism disposed inside the conduit 29 capable of assisting the transfer of material from the composter bin 24 to the access drawer 26. Examples of a transfer mechanism can include, but are not limited to, a rotatable auger, a conveyor, a gravitational chute, and the like.

A complete cycle of operation can include receiving organic material into the composter bin 24, mixing the organic material within the composter bin 24 while simultaneously drying the organic material and then transferring the organic material to the access drawer 26 after which the composted organic material can be removed. A more complete exemplary description of the mechanisms involved in a complete cycle of operation for the composting device 10 can be found in U.S. application Ser. No. 15/064,969, now U.S. Pat. No. 10,000,429, issued Jun. 19, 2018, which is incorporated by reference.

Figure 2:
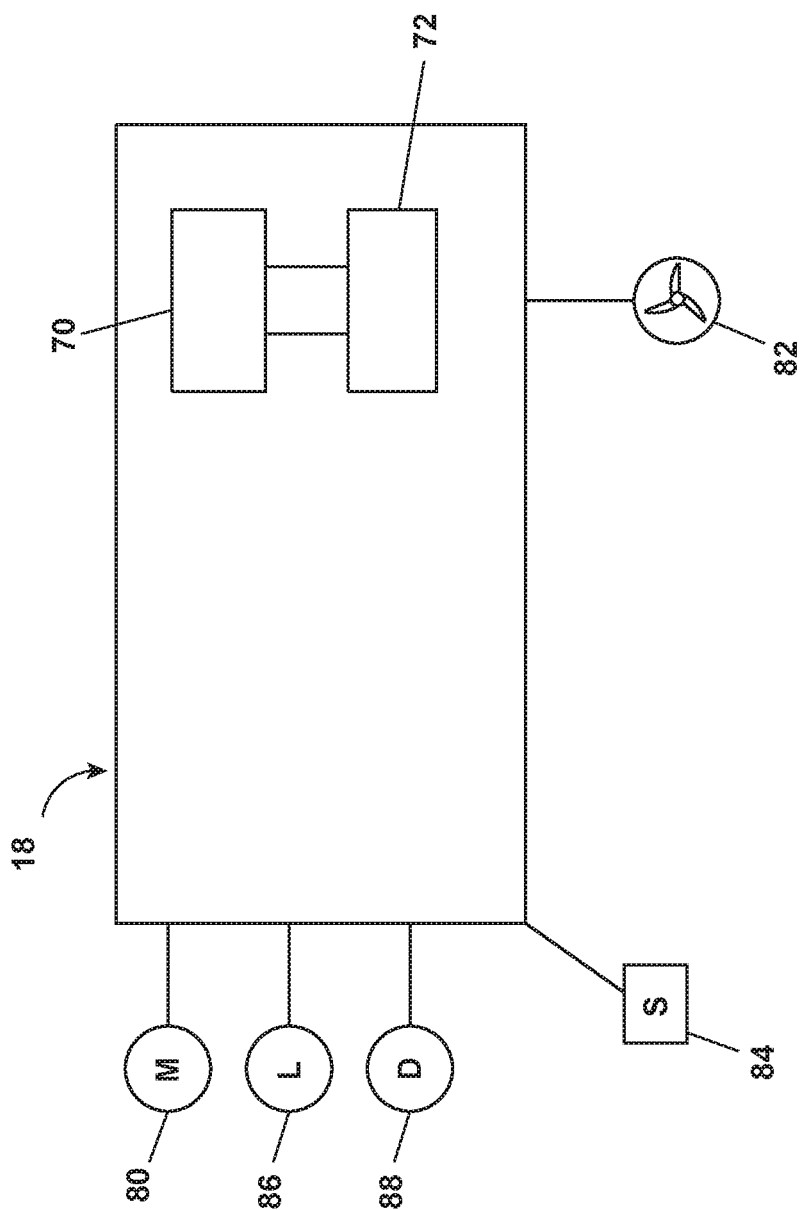
FIG. 2 is a block diagram of a control system of the composting device.

Referring now to FIG. 2, a schematic of the controller 18 for controlling the operation of the composting device 10 is illustrated. The controller 18 can be provided with a memory 70 and a central processing unit (CPU) 72. The memory 70 can be used for storing the control software that is executed by the CPU 72 in completing a cycle of operation using the composting device 10 and any additional software. The memory 70 can also be used to store information, such as a database or table, and to store data received from one or more components of the composting device 10 that can be communicably coupled with the controller 18.

The controller 18 can be operably coupled with one or more components of the composting device 10 for communicating with and controlling the operation of the component to complete a cycle of operation. For example, the controller 18 can be operably coupled with a motor 80 to control the operation of the motor 80. In another example, the controller 18 can be operably coupled to a fan 82. The controller 18 can also be coupled with one or more sensors 84 provided in one or more of the systems of the composting device 10 to receive input from other sensors in the composting device 10. The controller 18 can also be operably coupled to a lid switch 86 to control locking a lid lock 90 (FIG. 3) within the composting device 10 when in operation and unlocking the composting device 10 when a cycle has completed. The controller can be operably coupled to a door closing switch 88 to provide an automatic closing of the door 22.

Figure 3:
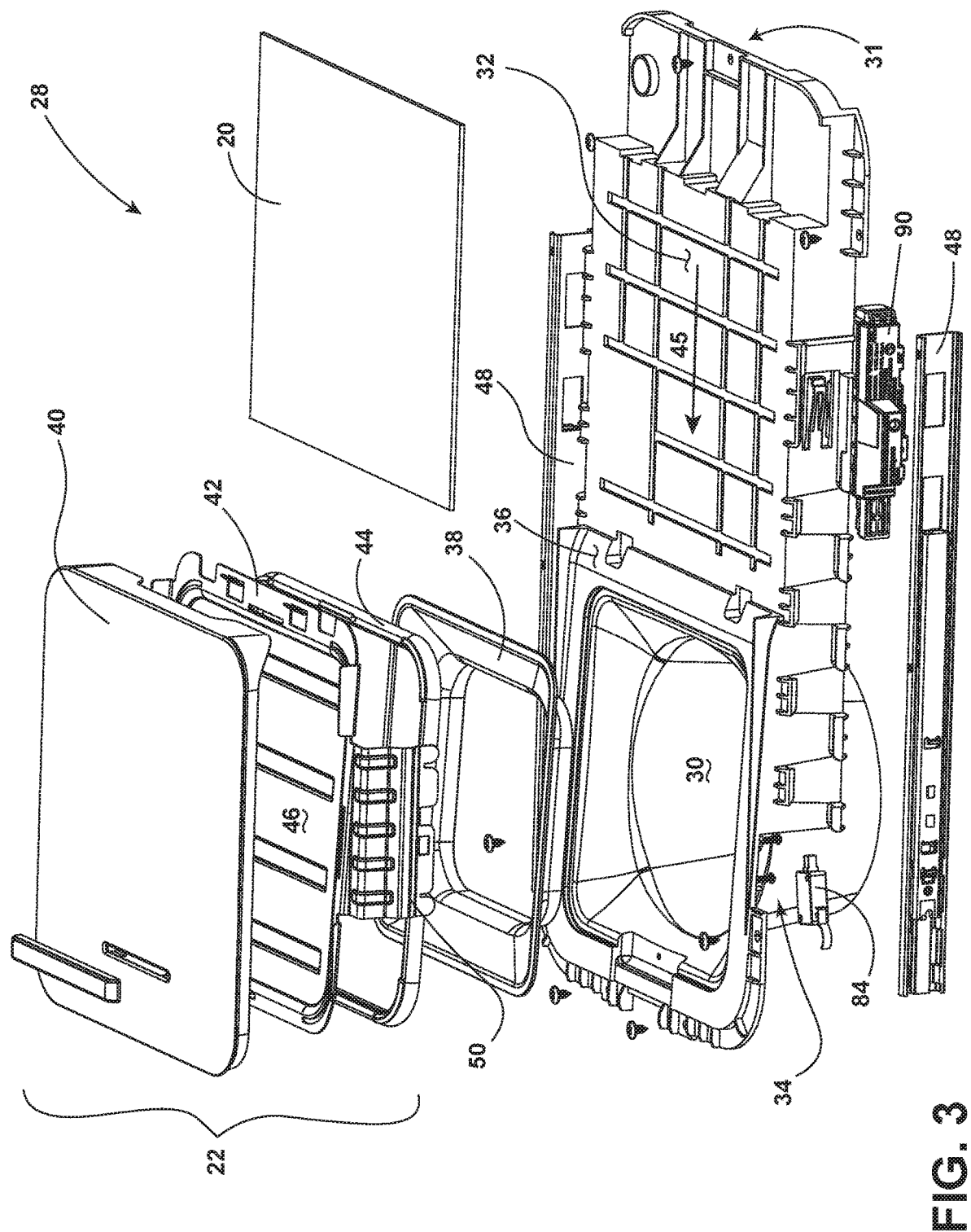
FIG. 3 is an exploded view of a lid assembly of the composting device.

FIG. 3 details the components of the lid assembly 28 of the composting device 10 in an exploded view. The lid assembly 28 is provided on top of the housing 12 for the composting device 10 such that when the door 22 is in an open position it provides direct access to the fill opening 23 of the composting bin 24. The lid assembly 28 includes a removable end plate 31 comprising a barrier portion 32 and a funnel 34. The funnel 34 defines an access opening 30 providing communication with the fill opening of the composter bin 24. A sealing surface 36 extends about the access opening 30 and, in some configurations, defines the access opening 30. In some configurations of the composting device 10, a trim bezel 38 can be placed on the funnel 34 and is illustrated as being within the sealing surface 36. The trim bezel 38 can surround the access opening 30 such that together the trim bezel 38 and the funnel 34 collectively define the access opening 30 when the trim bezel 38 is provided on the funnel 34.

The door 22 can comprise three parts, a fascia 40, a carriage 42, and a seal 44. The seal 44 can be mounted to the carriage 42 wherein when the door 22 is slid closed along a sliding path 45 the seal 44 comes in contact with the sealing surface 36. In one implementation, the seal 44 is compressible and complementary in orientation to the sealing surface 36 and is coated in an anti-friction coating.

The fascia 40 can overlie and be mounted to at least a portion of an outer surface 46 of the carriage 42. The carriage 42 can include a track coupler 50 formed to be slidably mounted to compound slide rails 48, though the slide rails can be any form of rail system including but not limited to dovetail slides, compound slides, and rack slides having friction bearing, ball bearing, or roller bearings.

Figure 4:
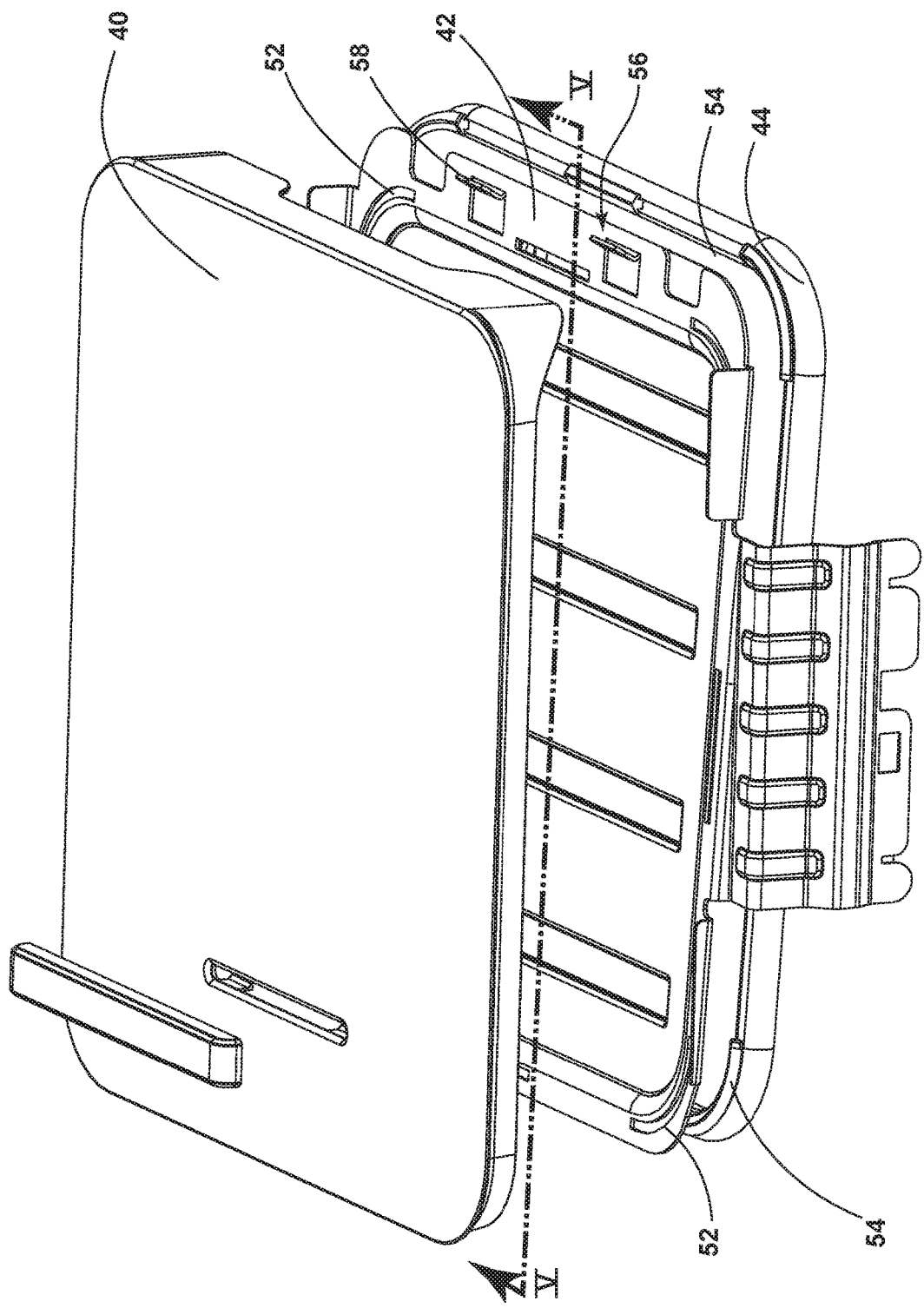
FIG. 4 is a detailed view of a portion of the lid assembly.

Turning to FIG. 4, the three parts of the door 22 are shown in more detail. The carriage 42 can include openings 52 formed to receive protruding portions 54. Each protruding portion 54 is formed on the seal 44 and shaped to be pushed one way through openings 52, for example but not limited to a snap, latch or hook end that link the carriage 42 to the seal 44.

The fascia 40 can be detachably mounted to the carriage 42 with a releasable connection comprising a snap connection 56. While illustrated as protruding from the carriage 42, the snap connection 56 can comprise at least one resilient hook 58 on a portion of the fascia 40 or the carriage 42 so as to be received by a snap fitting (FIG. 5) on the other of the carriage 42 or fascia 40.

Figure 5:
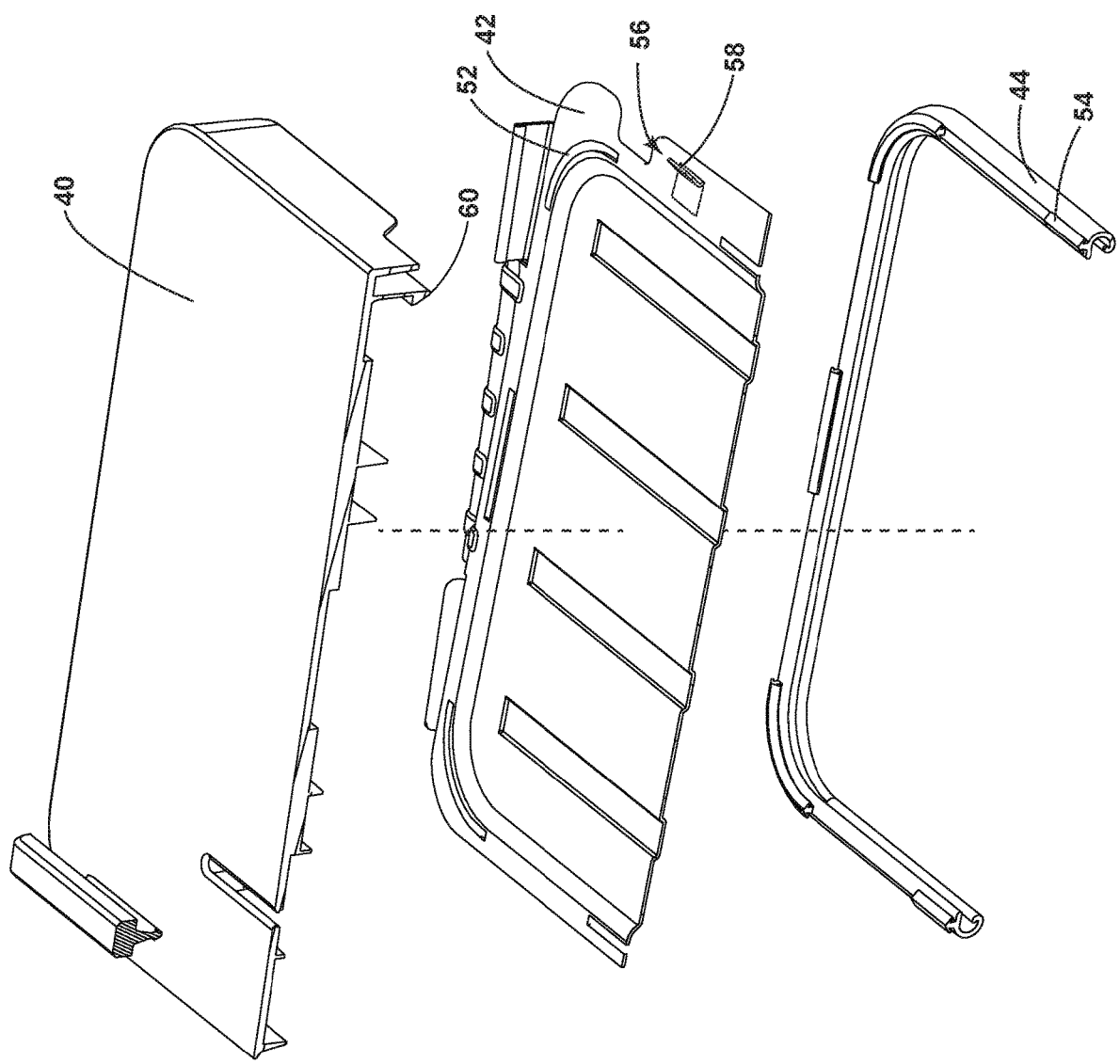
FIG. 5 is a cross section taken of the lid assembly in FIG. 4.

FIG. 5 is a section taken from FIG. 4 to illustrate the snap fitting 60 formed to receive the resilient hook 58. It can be contemplated that connecting the fascia 40 to the carriage 42 can be done by other connection types for example but not limited to a slide and hook connection.

The fascia 40 can be formed from a dishwasher safe material, for example but not limited to acrylonitrile butadiene styrene, melamine, nylon, polypropylene, or silicone, such that it retains its shape after being exposed to temperatures greater than 65° C. for at least 180 minutes. The material can also have a static friction coefficient of less than 0.3 using the ASTM D1894 coefficient of friction testing method.

While illustrated as having the three parts of fascia, carriage, and seal, the door assembly can comprise more or less parts, three parts is for illustrative purposes and is not meant to be limiting. For example the fascia can be mounted to a pivoting portion for a door designed to pivot rather than slide having only the fascia and sealing portion totally two parts. While it can be further contemplated that the fascia is mounted to a pivoting portion having a seal mounting surface and a seal totally four parts.

Benefits of a detachable fascia include both aesthetic and functional aspects. Aesthetically, a fascia creates a smooth surface free of undesirable edges or protrusions. A fascia that can be removed and replaced allows for updating colors or design when a user changes decor. Functionally a dishwasher safe fascia allows for cleaning including any harder to reach grooves or edges where food and debris can become lodged over time.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are doored by this disclosure.

This written description uses examples to disclose embodiments of the invention, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A food composter comprising:
a housing defining an interior;
an end plate affixed to the housing defining an access opening providing access to the interior and defining a sealing surface extending about the access opening;
a composting bin located within the interior and having a fill opening aligned with the access opening;
a door mounted to the end plate for selectively closing the access opening, the door comprising:
a carriage defining an outer surface and having a plurality of openings;
a seal including protruding portions received in the openings and carried by the carriage on a side opposite the outer surface and facing the sealing surface, wherein the seal contacts the sealing surface when the door is in a closed position; and
a detachable fascia overlying at least a portion of the outer surface, whereby the detachable fascia can be removed from the carriage for cleaning while the carriage remains affixed to the housing.

2. The food composter of claim 1 wherein the detachable fascia is made from dishwasher safe material.

3. The food composter of claim 2 wherein the dishwasher safe material retains its shape after being exposed to temperatures greater than 65° C. for at least 180 mins.

4. The food composter of claim 3 wherein the detachable fascia is made from a low friction material.

5. The food composter of claim 4 wherein the low friction material has a static friction coefficient of less than 0.3.

6. The food composter of claim 1 wherein the detachable fascia is made from a material that retains its shape after being exposed to temperatures greater than 65° C. for 180 mins.

7. The food composter of claim 1 wherein the detachable fascia is made from a low friction material and has a static friction coefficient of less than 0.3.

8. The food composter of claim 1 further comprising a releasable connection detachably mounting the detachable fascia to the door.

9. The food composter of claim 8 wherein the releasable connection comprises a snap connection.

10. The food composter of claim 9 wherein the snap connection comprises at least one resilient hook on one of the detachable fascia and the door that snaps over a portion of the other of the detachable fascia and the door.

11. The food composter of claim 10 wherein the resilient hook is provided on the detachable fascia.

12. The food composter of claim 1 wherein the door is slidably mounted to the housing.

13. The food composter of claim 1 further comprising at least one rail slidably mounting the carriage to the housing.

14. The food composter of claim 1 wherein the composter bin is generally vertically oriented.

15. A food composter comprising:
a housing defining an interior
an end plate affixed to the housing defining an access opening providing access to the interior and defining a sealing surface extending about the access opening;
a composting bin located within the interior and having a fill opening aligned with the access opening;
a door mounted to the end plate for selectively closing the access opening, the door comprising:
a carriage defining an outer surface and having a plurality of openings;
a seal including protruding portions received in the openings and carried by the carriage, on a side opposite the outer surface and facing the sealing surface, wherein the seal contacts the sealing surface when the door is in a closed position; and
a detachable fascia overlying at least a portion of the outer surface and having a snap connection snap-fitting the detachable fascia to the door, whereby the detachable fascia can be removed from the door for cleaning while the door remains affixed to the housing.

16. The food composter of claim 15 wherein the snap connection comprises at least one resilient hook on the detachable fascia that snaps over a portion of the door.

17. A food composter comprising:
a housing defining an interior;
an end plate with an access opening providing access to the interior and defining a sealing surface extending about the access opening;
a composting bin located within the interior in a generally vertical orientation and having a fill opening aligned with the access opening;
a door mounted to the end plate for selectively closing the access opening, the door comprising:
a carriage defining an outer surface and having a plurality of openings;
a seal including protruding portions received in the openings and carried by the carriage on a side opposite the outer surface and facing the sealing surface, wherein the seal contacts the sealing surface when the door is in a closed position; and
a detachable fascia overlying at least a portion of the outer surface and having a snap connection snap-fitting the detachable fascia to the door, whereby the detachable fascia can be removed from the door for cleaning while the door remains affixed to the housing.

18. The food composter of claim 17 wherein the snap connection comprises at least one resilient hook on the detachable fascia that snaps over a portion of the door.

* * * * *